(12) United States Patent
Stafford

(10) Patent No.: US 11,103,794 B2
(45) Date of Patent: Aug. 31, 2021

(54) POST-LAUNCH CROWD-SOURCED GAME QA VIA TOOL ENHANCED SPECTATOR SYSTEM

(71) Applicant: Sony Interactive Entertainment Inc., Tokyo (JP)

(72) Inventor: Jeffrey R. Stafford, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 27 days.

(21) Appl. No.: 16/657,571

(22) Filed: Oct. 18, 2019

(65) Prior Publication Data
US 2021/0113928 A1 Apr. 22, 2021

(51) Int. Cl.
*A63F 13/86* (2014.01)
*G06F 11/36* (2006.01)
*A63F 13/792* (2014.01)

(52) U.S. Cl.
CPC ............ *A63F 13/86* (2014.09); *A63F 13/792* (2014.09); *G06F 11/3664* (2013.01)

(58) Field of Classification Search
CPC .............................. A63F 13/86; G06F 11/3664
See application file for complete search history.

(56) References Cited

U.S. PATENT DOCUMENTS

| | | | |
|---|---|---|---|
| 2014/0243082 A1* | 8/2014 | Harris | A63F 13/12 463/31 |
| 2016/0082348 A1* | 3/2016 | Kehoe | G06Q 10/101 463/31 |
| 2017/0266568 A1* | 9/2017 | Lucas | A63F 13/77 |
| 2018/0096504 A1* | 4/2018 | Valdivia | G06F 3/0346 |
| 2018/0173309 A1* | 6/2018 | Uchiyama | G06F 3/016 |
| 2018/0342106 A1* | 11/2018 | Rosado | A63F 13/86 |
| 2019/0076742 A1* | 3/2019 | Lucas | A63F 13/77 |
| 2019/0121717 A1* | 4/2019 | Francis | G06F 11/366 |
| 2020/0310783 A1* | 10/2020 | Schmidt | G06F 8/656 |

OTHER PUBLICATIONS

McAloon, Alissa, "Ubisoft is rewarding players for reporting reproducible bugs in Rainbow Six Siege," Apr. 25, 2019, available at https://www.gamasutra.com/view/news/341494/Ubisoft_is_rewarding_players_for_reporting_reproducible_bugs_in_Rainbow_Six_Siege.php (Year: 2019).*

\* cited by examiner

*Primary Examiner* — Jay Trent Liddle
(74) *Attorney, Agent, or Firm* — John L. Rogitz

(57) ABSTRACT

A spectator of a computer simulation who is not playing the computer simulation and is associated with a spectator device for viewing the simulation without controlling it is identified. An indication can be received from the spectator that a portion of the computer simulation contains an error. The indication is transmitted to a computer network, from whence is received a corrected version of the computer simulation that does not contain the error. The corrected version of the computer simulation can then be presented. The spectator may be awarded for reporting the error.

20 Claims, 6 Drawing Sheets

POST-LAUNCH CROWD-SOURCED GAME QA VIA TOOL ENHANCED SPECTATOR SYSTEM

FIELD

The application relates generally to technically inventive, non-routine solutions that are necessarily rooted in computer technology and that produce concrete technical improvements.

BACKGROUND

Increasingly, computer simulations such as computer games not only are watched by gamers actively playing the games, but also by spectators who are not in the game. Present principles understand that input from the spectators can be used to correct discrepancies in the game.

SUMMARY

Accordingly, a system includes at least one computer simulation controller and at least one computer simulation source configured to receive input from the computer simulation controller to control presentation of a computer simulation presented on at least one display. The system includes at least one processor and at least one storage accessible to the processor with instructions executable by the processor to identify at least a spectator device of a first spectator of the computer simulation who is not playing the computer simulation. The instructions are executable to receive from the spectator device input indicating a portion of the computer simulation containing an error, and to transmit an indication of the error to a computer network. The instructions also are executable to receive from the computer network a corrected version of the computer simulation that does not contain the error and present the corrected version of the computer simulation.

The computer simulation source may include a network server communicating with the computer simulation controller over a computer network, and/or a computer game console communicating directly with the computer simulation controller.

In examples, the input is received from a tool executed by the spectator device to paint and record comments on the computer simulation. The tool may include a paint rod with comments.

In non-limiting implementations, the instructions are executable to, in response to the input, award the spectator with game currency. The spectator device may include a smart phone, a tablet computer, or a simulation controller. The comments may be audio and/or text.

In another aspect, a server includes at least one network interface and at least one processor configured to access at least one computer storage with instructions executable by the processor to receive over the network interface a report from a device of a spectator of a computer simulation being controlled by a device other than the device of the spectator of at least one error in the computer simulation. The instructions are executable to provide the report to at least one computer associated with a developer of the computer simulation. The instructions are further executable to transmit to at least one computer simulation system an indication that a corrected version of the computer simulation that does not contain the error is available.

In some examples, the instructions can be executable to receive the corrected version and to download the corrected version to a computer simulation system. The corrected version may be downloaded to a computer simulation system automatically without request, or upon request from the computer simulation system.

In an example embodiment, the instructions are executable to transmit to the device of the spectator at least one message indicating that the report was useful. The message can include one or more selections including allowing the spectator to select to be awarded simulation points as an award for the report and/or allowing the spectator to select to be awarded system currency to purchase a simulation as an award for the report.

In another aspect, a method includes presenting a computer simulation on a device associated with a spectator of the computer simulation, the device of the spectator not controlling the computer simulation. The method also includes receiving from the device at last one indication of at least one error in the computer simulation and providing the indication to a developer of the computer simulation.

The details of the present application, both as to its structure and operation, can best be understood in reference to the accompanying drawings, in which like reference numerals refer to like parts, and in which:

DETAILED DESCRIPTION

Figure 1:
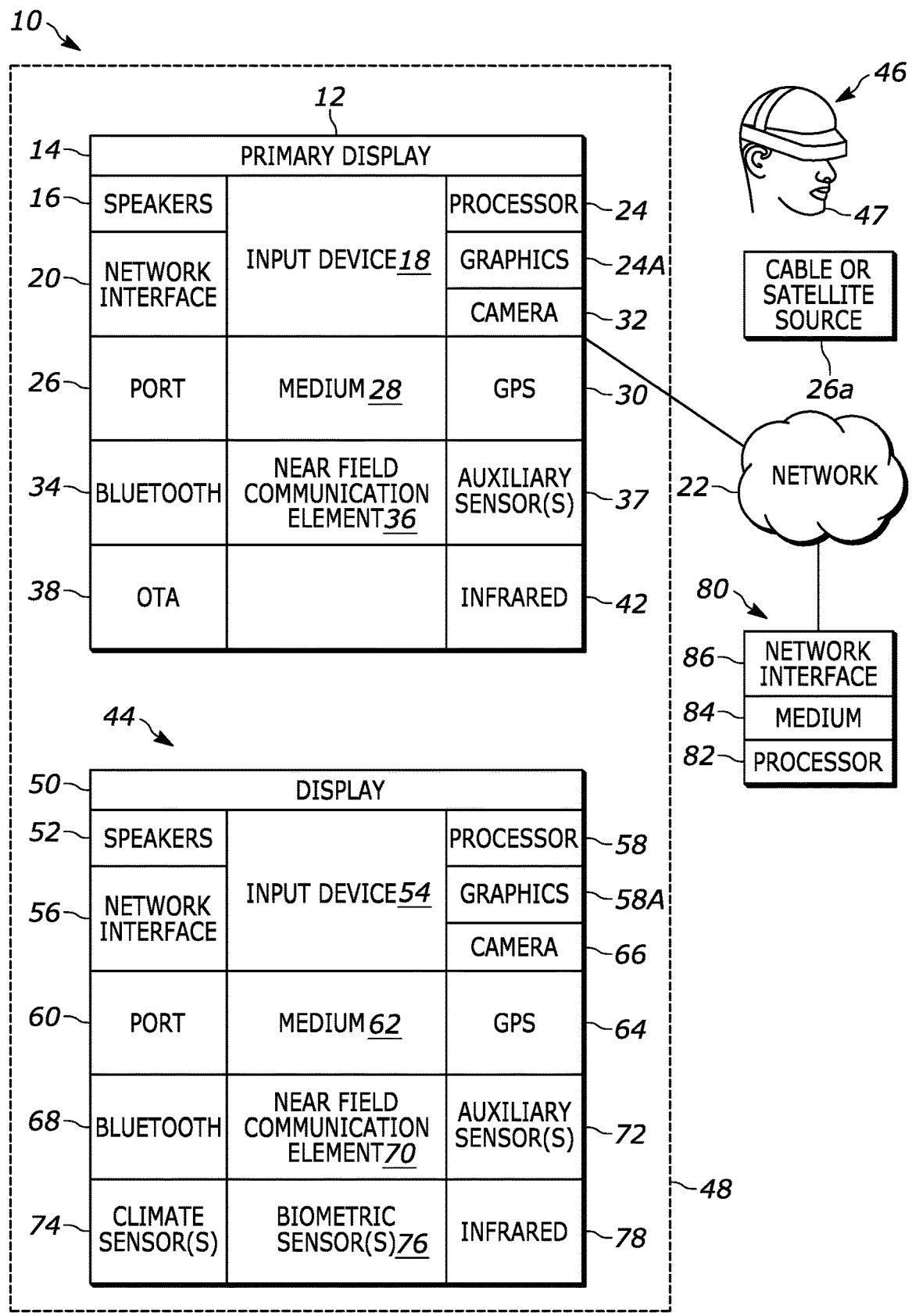
FIG. 1 is a block diagram of an example system including an example in accordance with present principles.

This disclosure relates generally to computer ecosystems including aspects of consumer electronics (CE) device networks such as but not limited to computer simulation networks such as computer game networks as well as standalone computer simulation systems. A system herein may include server and client components, connected over a network such that data may be exchanged between the client and server components. The client components may include one or more computing devices including game consoles such as Sony PlayStation® or a game console made by Microsoft or Nintendo or other manufacturers of virtual reality (VR) headsets, augmented reality (AR) headsets, portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple Computer or Google. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may include one or more processors executing instructions that configure the servers to receive and transmit data over a network such as the Internet. Or, a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general-purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to Java, C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires. Such connections may include wireless communication connections including infrared and radio.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). However, the AVD 12 alternatively may be an appliance or household item, e.g. computerized Internet enabled refrigerator, washer, or dryer. The AVD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVD 12 is configured to undertake present principles (e.g. communicate with other CE devices to undertake present principles, execute the logic described herein, and perform any other functions and/or operations described herein).

Accordingly, to undertake such principles the AVD 12 can be established by some or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as e.g. an audio receiver/microphone for e.g. entering audible commands to the AVD 12 to control the AVD 12. The example AVD 12 may also include one or more network interfaces 20 for communication over at least one network 22 such as the Internet, an WAN, an LAN, etc. under control of one or more processors 24 including. A graphics processor 24A may also be included. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVD 12 may also include one or more input ports 26 such as, e.g., a high definition multimedia interface (HDMI) port or a USB port to physically connect (e.g. using a wired connection) to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be, e.g., a separate or integrated set top box, or a satellite receiver. Or, the source 26a may be a game console or disk player containing content that might be regarded by a user as a favorite for channel assignment purposes described further below. The source 26a when implemented as a game console may include some or all of the components described below in relation to the CE device 44.

The AVD 12 may further include one or more computer memories 28 such as disk-based or solid state storage that are not transitory signals, in some cases embodied in the chassis of the AVD as standalone devices or as a personal video recording device (PVR) or video disk player either internal or external to the chassis of the AVD for playing back AV programs or as removable memory media. Also in some embodiments, the AVD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVD 12 is disposed in conjunction with the processor 24. However, it is to be understood that another suitable position receiver other than a cellphone receiver, GPS receiver and/or altimeter may be used in accordance with present principles to e.g. determine the location of the AVD 12 in e.g. all three dimensions.

Continuing the description of the AVD 12, in some embodiments the AVD 12 may include one or more cameras 32 that may be, e.g., a thermal imaging camera, a digital camera such as a webcam, and/or a camera integrated into the AVD 12 and controllable by the processor 24 to gather pictures/images and/or video in accordance with present principles. Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command, etc.) providing input to the processor 24. The AVD 12 may include an over-the-air TV broadcast port 38 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12.

Still referring to FIG. 1, in addition to the AVD 12, the system 10 may include one or more other CE device types. In one example, a first CE device 44 may be used to send computer game audio and video to the AVD 12 via commands sent directly to the AVD 12 and/or through the below-described server while a second CE device 46 may include similar components as the first CE device 44. In the example shown, the second CE device 46 may be configured as a VR headset worn by a player 47 as shown. In the example shown, only two CE devices 44, 46 are shown, it being understood that fewer or greater devices may be used. For example, principles below discuss multiple players 47 with respective headsets communicating with each other during play of a computer game sourced by a game console to one or more AVD 12.

In the example shown, to illustrate present principles all three devices 12, 44, 46 are assumed to be members of an entertainment network in, e.g., a home, or at least to be present in proximity to each other in a location such as a house. However, present principles are not limited to a particular location, illustrated by dashed lines 48, unless explicitly claimed otherwise.

The example non-limiting first CE device 44 may be established by any one of the above-mentioned devices, for example, a portable wireless laptop computer or notebook computer or game controller, and accordingly may have one or more of the components described below. The first CE device 44 may be a remote control (RC) for, e.g., issuing AV play and pause commands to the AVD 12, or it may be a more sophisticated device such as a tablet computer, a game controller communicating via wired or wireless link with the AVD 12 and/or a game console, a personal computer, a wireless telephone, etc.

Accordingly, the first CE device 44 may include one or more displays 50 that may be touch-enabled for receiving user input signals via touches on the display. The first CE device 44 may include one or more speakers 52 for outputting audio in accordance with present principles, and at least one additional input device 54 such as e.g. an audio receiver/microphone for e.g. entering audible commands to the first CE device 44 to control the device 44. The example first CE device 44 may also include one or more network interfaces 56 for communication over the network 22 under control of one or more CE device processors 58. A graphics processor 58A may also be included. Thus, the interface 56 may be, without limitation, a Wi-Fi transceiver, which is an example of a wireless computer network interface, including mesh network interfaces. It is to be understood that the processor 58 controls the first CE device 44 to undertake present principles, including the other elements of the first CE device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first CE device 44 may also include one or more input ports 60 such as, e.g., a HDMI port or a USB port to physically connect (e.g. using a wired connection) to another CE device and/or a headphone port to connect headphones to the first CE device 44 for presentation of audio from the first CE device 44 to a user through the headphones. The first CE device 44 may further include one or more tangible computer readable storage medium 62 such as disk-based or solid-state storage. Also in some embodiments, the first CE device 44 can include a position or location receiver such as but not limited to a cellphone and/or GPS receiver and/or altimeter 64 that is configured to e.g. receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that another suitable position receiver other than a cellphone and/or GPS receiver and/or altimeter may be used in accordance with present principles to e.g. determine the location of the first CE device 44 in e.g. all three dimensions.

Continuing the description of the first CE device 44, in some embodiments the first CE device 44 may include one or more cameras 66 that may be, e.g., a thermal imaging camera, a digital camera such as a webcam, and/or a camera integrated into the first CE device 44 and controllable by the CE device processor 58 to gather pictures/images and/or video in accordance with present principles. Also included on the first CE device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first CE device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the CE device processor 58. The first CE device 44 may include still other sensors such as e.g. one or more climate sensors 74 (e.g. barometers, humidity sensors, wind sensors, light sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 78 such as an IR data association (IRDA) device. A battery (not shown) may be provided for powering the first CE device 44. The CE device 44 may communicate with the AVD 12 through any of the above-described communication modes and related components.

The second CE device 46 may include some or all of the components shown for the CE device 44. Either one or both CE devices may be powered by one or more batteries.

Now in reference to the afore-mentioned at least one server 80, it includes at least one server processor 82, at least one tangible computer readable storage medium 84 such as disk-based or solid state storage, and at least one network interface 86 that, under control of the server processor 82, allows for communication with the other devices of FIG. 1 over the network 22, and indeed may facilitate communication between servers and client devices in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 80 may be an Internet server or an entire server "farm", and may include and perform "cloud" functions such that the devices of the system 10 may access a "cloud" environment via the server 80 in example embodiments for, e.g., network gaming applications. Or, the server 80 may be implemented by one or more game consoles or other computers in the same room as the other devices shown in FIG. 1 or nearby.

The methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a CD ROM or Flash drive. The software code instructions may alternatively be embodied in a transitory arrangement such as a radio or optical signal, or via a download over the internet.

Figure 2:
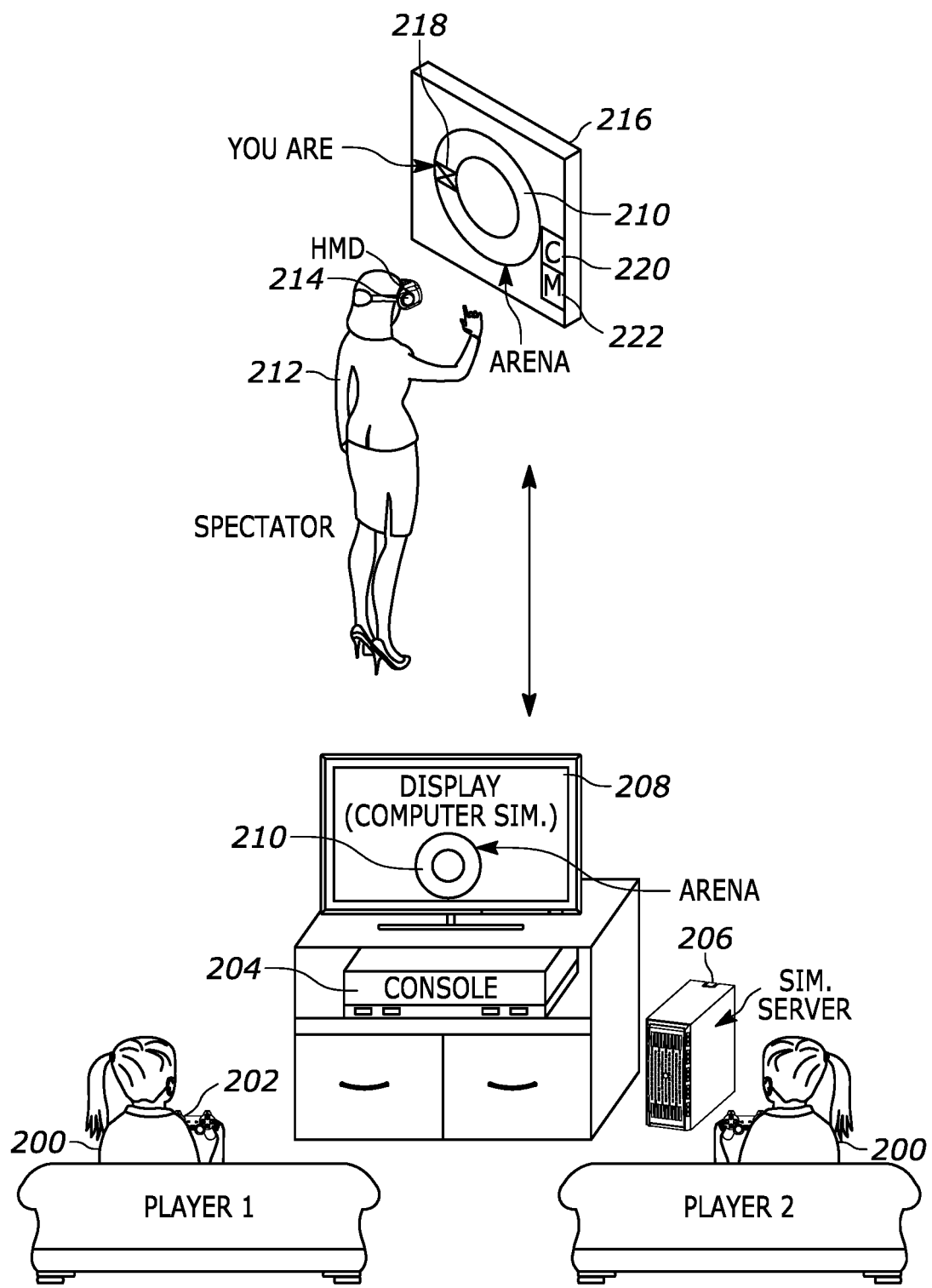
FIG. 2 schematically illustrates a computer simulation/esports spectator watching a computer simulation being played by others.

Now referring to FIG. 2, two (or more) computer simulation players 200 are shown playing a computer simulation such as but not limited to a computer game or e-sport by manipulating respective simulation controllers 202 to control a simulation sourced by a simulation console 204 and/or Internet server 206 for audio-video display of the simulation on one or more displays 208. In the example shown, a virtual arena 210 is shown as part of the simulation being presented on the display 208.

Additionally, one or more spectators 212 (only a single spectator shown for clarity) may observe the simulation being presented on the display 208 without being a player of the simulation. The spectator 212 may observe the simulation because the simulation can be provided to a display associated with the spectator, such as a virtual reality (VR) head-mounted display (HMD) 214 and/or a display 216 of a computing device such as a tablet computer, smart phone, etc. The HMD 214 and/or display 216 may include cameras to image the face of the spectator 212 to provide information both for gaze tracking information and emotional state of the spectator 212.

In the example shown, the virtual arena 210 is presented on the display 216 along with an indication 218 of where in the virtual arena 210 the spectator 212 is emulated to be located. The device hosting the display 216 may include any of the appropriate components discussed above in relation to FIG. 1, including a camera or other imaging device 220 and a microphone 222.

Figure 3:
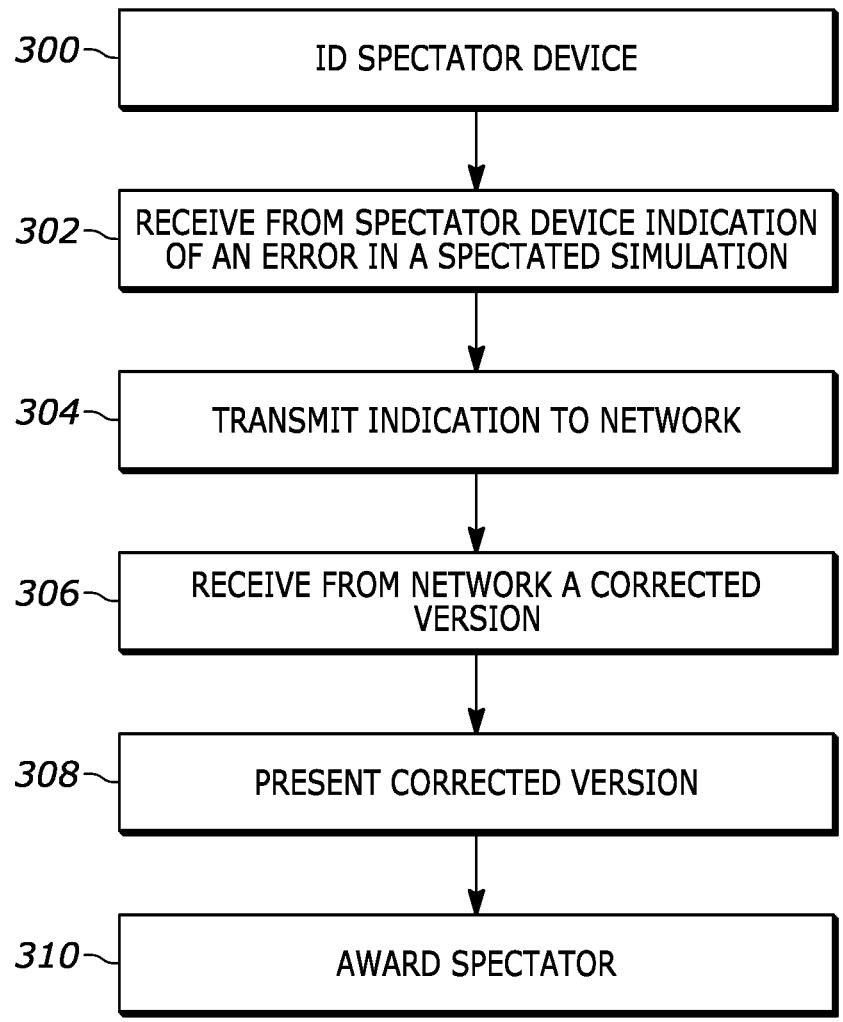
FIG. 3 is a flow chart of overall example logic consistent with present principles.

Now referring to FIG. 3, logic is shown that may be executed by one or more of the processors described herein. Typically, the logic of FIG. 3 is executed by server such as the server 206 shown in FIG. 2.

Commencing at block 300, one or more devices of one or more spectators of a computer simulation, such as the HMD 214 or display device 216 shown in FIG. 2, is identified, typically when the device registers or logs in or otherwise communicatively connects to the system to spectate the computer simulation being played by players such as the players 200 shown in FIG. 2. As will be developed more fully below, at block 302 the system receives from a spectator device an indication of an error in the computer simulation being spectated. At block 304 the indication may be propagated to a computer network and specifically to a computer associated with a developer of the computer simulation.

Assuming the error was a legitimate error, the developer can generate a corrected version of the computer simulation, which may be received at block 306. The corrected version may be presented on one or more computer simulation playback devices at block 308, e.g., by downloading the corrected version to an end user. The reporting spectator may be awarded for reporting the error at block 310.

Figure 4:
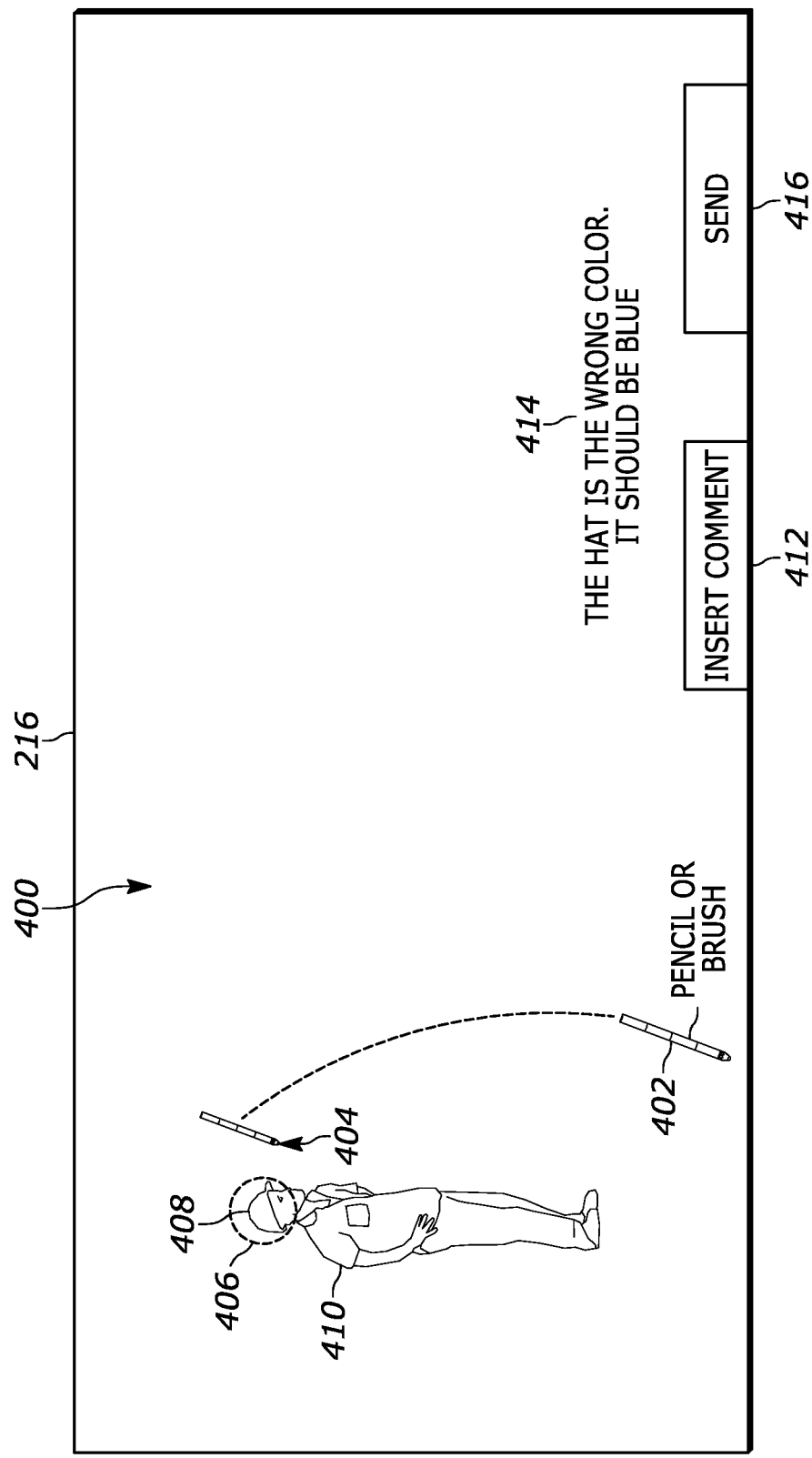
FIG. 4 is a screen shot of an example user interface (UI) that may be presented on the spectator device consistent with present principles.

FIG. 4 illustrates further. As shown, the spectator display 216 can present a computer simulation 400 for spectating by a person viewing the display 216, without being able to control the computer simulation in the manner of the players 200 shown in FIG. 2. The display 216 may present a user interface (UI) that includes a tool executed by the spectator device to indicate a display region and input comments on the computer simulation. In the example shown, the tool includes a paint rod or pencil or brush 402 that is movable by means of, e.g., a drag-and-drop device as indicated at 404 to circle or otherwise indicate a region 406 of the display as shown. In FIG. 4, the spectator has circled a hat 408 being worn by a simulation character 410.

The tool may further include a selector 412 to allow the spectator to insert a comment pertaining to the display region indicated by the rod 402, which the spectator has done as indicated at 414 in FIG. 4, indicating that the color of the hat 408 is an incorrect color, perhaps because it was initially depicted in the simulation as being a different color. In any case, a send selector 416 may be provided to send the coordinates of the region 406 and the comment 414 to the server.

The comment may be input using text or voice. In general, the tool may be implemented by text and/or voice input.

Figure 5:
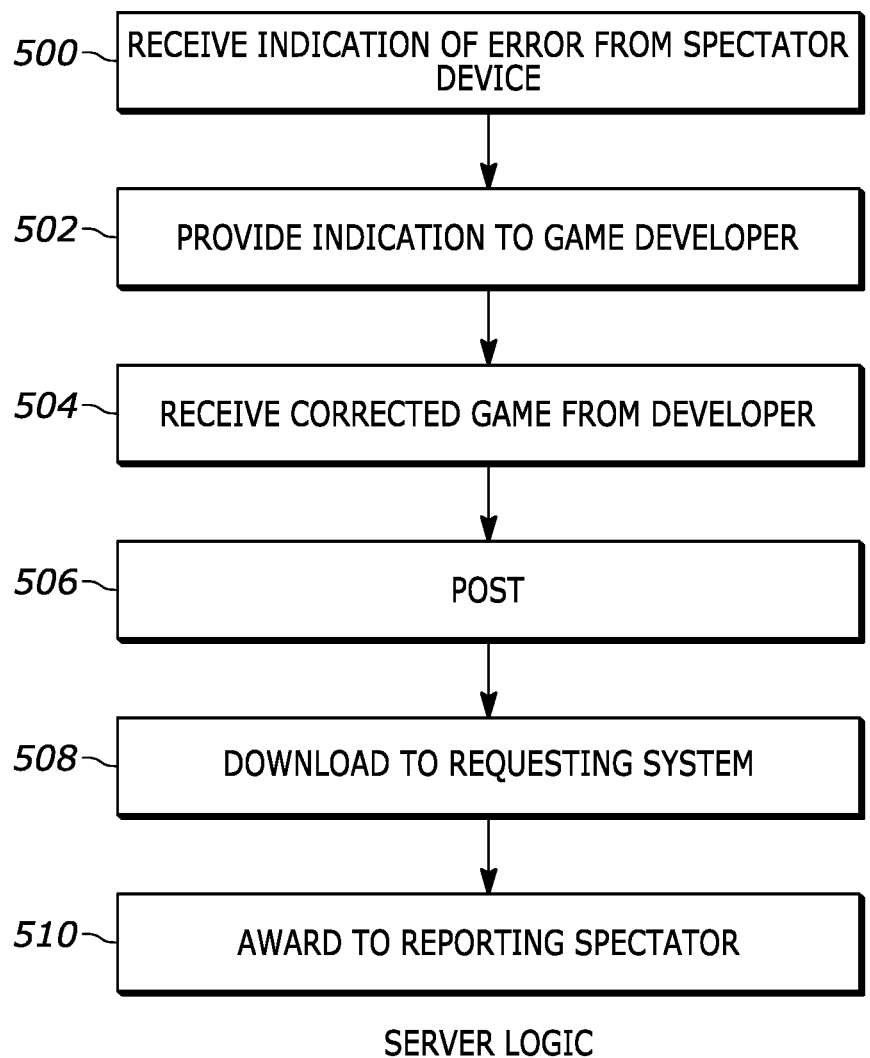
FIG. 5 is a flow chart of example server logic consistent with present principles.

FIG. 5 illustrates additional server logic. Commencing at block 500, the indication of an error from, e.g., FIG. 4 is received, along with identifying information of the reporting spectator device. The error information is provided to the developer of the computer simulation, e.g., to a server or other computer associated therewith, at block 502.

A corrected version of the computer simulation that omits or otherwise corrects the error reported at block 500 is received from the developer at block 504. The corrected simulation may be posted or otherwise made available for, e.g., download by end users at block 506. Proceeding to block 508, the corrected version is downloaded to a requesting user. At block 510 the spectator who reported the error is granted an award.

Figure 6:
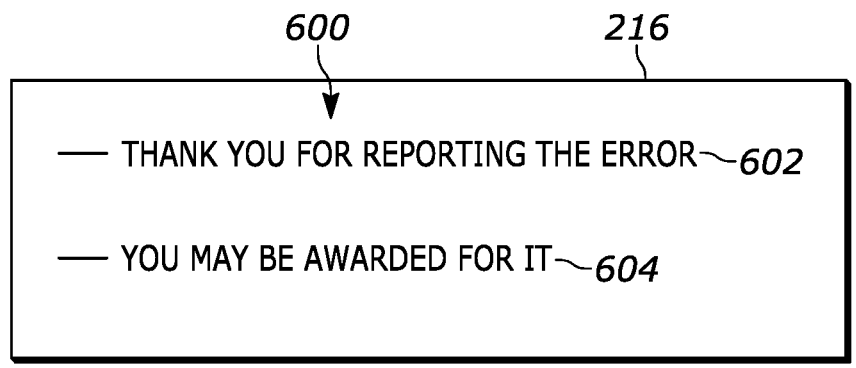
FIG. 6 is a screen shot of an example UI that may be presented on the spectator device responsive to receiving a report of an error.

FIG. 6 illustrate further. A UI 600 may be presented on the spectator display 216 in response to the spectator reporting an error using, e.g., the UI of FIG. 4. The UI 600 in FIG. 6 may include a message 602 acknowledging the error report and an advisory 604 indicating that the spectator may be awarded for the report.

Figure 7:
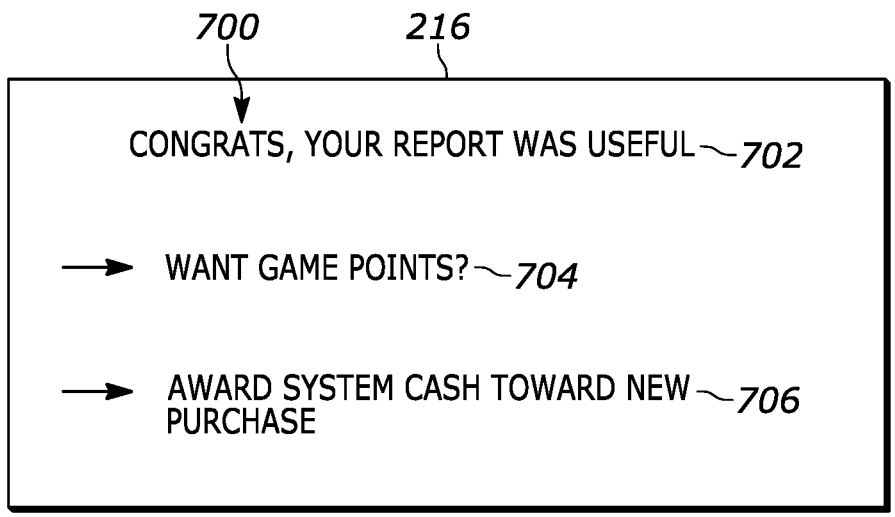
FIG. 7 is a screen shot of an example UI that may be presented on the spectator device responsive to the report of the error having been found useful.

In some embodiments, the spectator may be awarded as soon as the spectator sends the error report. However, in the embodiment further illustrated by FIG. 7, a UI 700 is presented on the spectator display 216 only after the developer has received the error report and acknowledged its correctness. In further embodiments, a developer may only acknowledge correctness of a spectator reported error only when they have received numerous matching (significantly similar) error reports from other spectators. In referring to the example shown in FIG. 4, many different spectators may report that the hat 406 is the wrong color and state the correct color for the simulation character 410. In this way, the developer can ensure that they are only checking error reports from commonly reported errors, thus ensuring they are not responding to false or malicious error reports. In addition, it should be understood that a developer may use the frequency of matching error repots as an indicator of the priority of the error, thus providing the developer with a way to selectively decide on the order of which errors to address and award in sequence.

After a developer has processed the error report, a message 702 can be presented indicating to the spectators that the error report was found to be useful. One or more selectors may then be provided to enable the spectator to accept an award. In the non-limiting example shown, the spectator may select a first selector 704 to be awarded game points to be used during play of a computer simulation. The spectator alternatively may select a second selector 706 to be awarded system currency that can be applied to the purchase of an item such as a new computer simulation.

Figure 8:
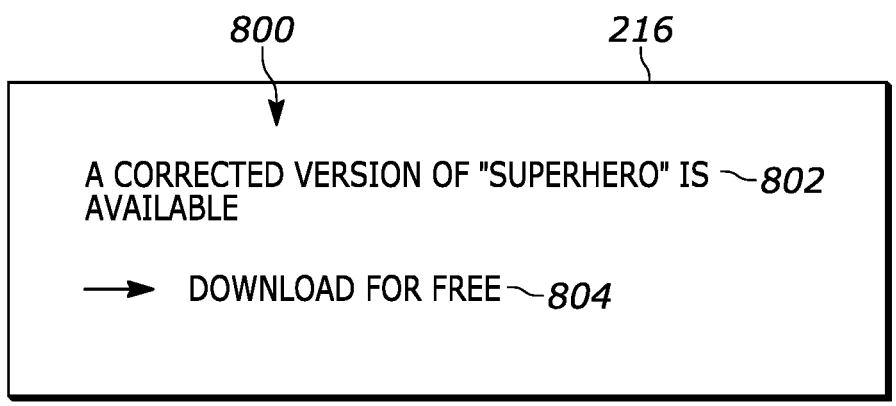
FIG. 8 is a screen shot of an example UI that may be presented on the spectator device or other device including simulation player system indicating the availability of a corrected version of the simulation.

FIG. 8 illustrates a UI 800 that may be presented on a spectator or player display, indicating, at 802, that a corrected version of the simulation that precipitated the error report is available. A selector 804 may be provided to enable the user to download the corrected version, in the non-limiting example shown, for free.

It will be appreciated that whilst present principals have been described with reference to some example embodiments, these are not intended to be limiting, and that various alternative arrangements may be used to implement the subject matter claimed herein.

What is claimed is:

1. A system comprising:
at least one computer simulation controller;
at least one computer simulation source configured to receive input from the computer simulation controller to control presentation of a computer simulation presented on at least one display, the system comprising at least one processor and at least one storage accessible to the processor and comprising instructions executable by the processor to:
identify at least a spectator device of a first spectator of the computer simulation who is not playing the computer simulation;
receive from the spectator device input indicating a portion of the computer simulation containing an error;
transmit an indication of the error to a computer network;
receive from the computer network a corrected version of the computer simulation that does not contain the error in response to the computer network receiving at least plural reports of the error from respective plural spectators; and
present the corrected version of the computer simulation on the display.

2. The system of claim 1, wherein the computer simulation source comprises a network server communicating with the computer simulation controller over a computer network.

3. The system of claim 1, wherein the computer simulation source comprises a computer game console communicating directly with the computer simulation controller.

4. The system of claim 1, wherein the input is received from a tool executed by the spectator device to indicate a display region and input comments on the computer simulation.

5. The system of claim 4, wherein the tool comprises a paint rod with capability to add comments.

6. The system of claim 5, wherein the comments comprise audio.

7. The system of claim 5, wherein the comments comprise text.

8. The system of claim 1, wherein the instructions are executable to, in response to the input, award the spectator with game currency.

9. The system of claim 1, wherein the spectator device comprises a smart phone.

10. The system of claim 1, wherein the spectator device comprises a tablet computer.

11. The system of claim 1, wherein the spectator device comprises a simulation controller.

12. A server comprising:
at least one network interface;
at least one processor configured to access at least one computer storage with instructions executable by the processor to:
receive over the network interface reports from devices of respective spectators of a computer simulation being controlled by a device other than the device of the spectators of at least one error in the computer simulation;
provide the reports to at least one computer associated with a developer of the computer simulation;

using a frequency of matching error repots as an indicator of priority of the error to establish an order of which errors to address; and transmit to at least one computer simulation system an indication that a corrected version of the computer simulation that does not contain the error is available.

13. The server of claim 12, wherein the instructions are executable to:

receive the corrected version; and download the corrected version to a computer simulation system.

14. The server of claim 13, wherein the instructions are executable to download the corrected version to a computer simulation system automatically without request for a download of the corrected version.

15. The server of claim 13, wherein the instructions are executable to download the corrected version to a computer simulation system upon request from the computer simulation system.

16. The server of claim 12, wherein the instructions are executable to:

transmit to the device of the spectator at least one message indicating that the report was useful.

17. The server of claim 16, wherein the message includes at least one selection allowing the spectator to select to be awarded simulation points as an award for the report.

18. The server of claim 16, wherein the message includes at least one selection allowing the spectator to select to be awarded system currency to purchase a simulation as an award for the report.

19. A method comprising:

presenting a computer simulation on a device associated with a spectator of the computer simulation, the device of the spectator not controlling the computer simulation;

receiving from the device at last one indication of at least one error in the computer simulation; and providing the indication to a developer of the computer simulation, wherein the developer corrects the error only in response to receiving at least plural reports of the error from respective plural spectators to avoid responding to false or malicious error reports.

20. The method of claim 19, comprising:

downloading a corrected version of the computer simulation that does not include the error.

\* \* \* \* \*